UNITED STATES PATENT OFFICE.

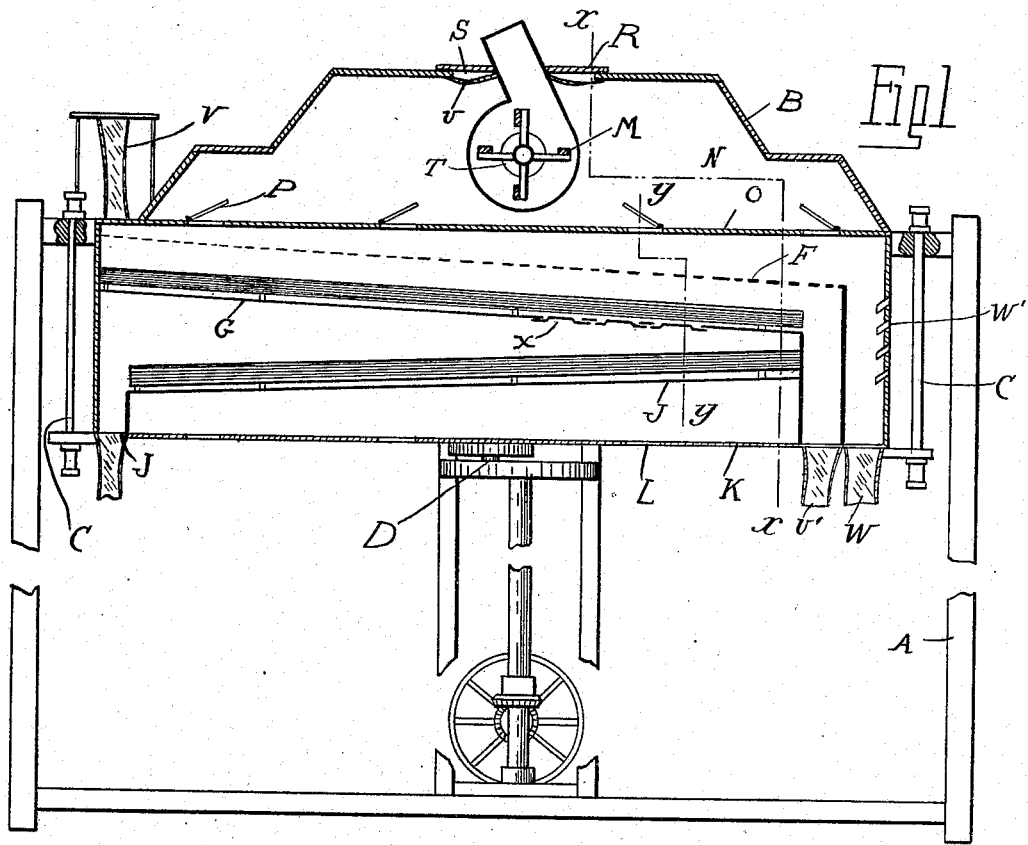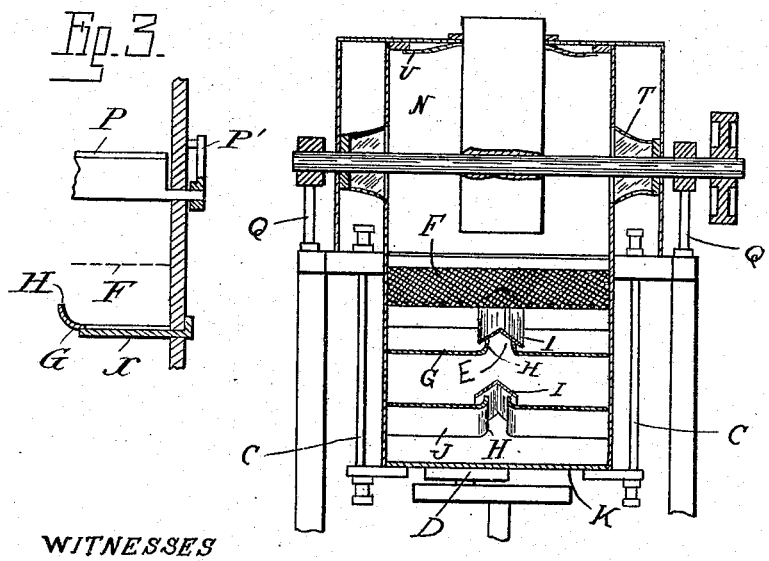

LUTHER A. TATOR, OF MILAN, MICHIGAN, ASSIGNOR OF ONE-THIRD TO CHARLES H. WILSON AND ONE-THIRD TO MYRON W. WILSON, OF MILAN, MICHIGAN.

MIDDLINGS-PURIFIER.

No. 930,504.  Specification of Letters Patent.  Patented Aug. 10, 1909.

Application filed October 5, 1907.  Serial No. 396,034.

*To all whom it may concern:*

Be it known that I, LUTHER A. TATOR, a citizen of the United States of America, residing at Milan, in the county of Washtenaw and State of Michigan, have invented certain new and useful Improvements in Middlings-Purifiers, of which the following is a specification, reference being had therein to the accompanying drawings.

The invention relates to middlings purifiers and has for its object the obtaining of a machine of simple construction, dispensing with the usual power driven conveyers and effecting the purification of the stock without detrimental abrasive action thereon.

It is a further object to effect an accurate grading of the stock, and further to prevent the introduction of dust impurities in the stock.

These objects are attained by the construction as hereinafter set forth.

In the drawings—Figure 1 is a vertical central section through the machine; Fig. 2 is a cross section on line $x$—$x$, Fig. 1; Fig. 3 is a fragmentary section on line $y$—$y$, Fig. 1.

In the present state of the art, the purification of middlings is usually accomplished by feeding the stock over a reciprocatory screen, through which an upwardly directed air current is passed to remove the dust and impurities. This reciprocatory screen is usually arranged in a stationary casing into which the air is drawn through openings in the side by means of a fan or other suction device arranged above the screen. Mechanically driven devices are employed for cleaning the screen, and the stock which passes through the screen is carried by mechanically driven conveyers, usually worm conveyers, to the various points of discharge.

With my improved construction, instead of reciprocating the screen within a stationary housing, I employ an oscillating housing, and in place of power driven devices for cleaning the screen and feeding the stock, this is effected by the oscillation of the housing. Thus the machine is greatly simplified in construction and the power required for its operation reduced.

As illustrated, A is a suitable open frame work and B is the oscillatory housing mounted thereon. The housing B is preferably supported by hanger rods C at the opposite ends and sides thereof, and oscillatory movement is imparted to the casing by a crank D revolving in a horizontal plane beneath the casing and actuated by suitable driving mechanism.

F is the screen mounted upon a suitable frame and arranged within the housing B in the inclined position illustrated. Beneath this screen is a substantial parallelly arranged apron G for collecting the stock passing through the screen and conveying it, during the oscillation of the casing, to one end thereof. This apron G is formed with a central longitudinally extending aperture E therein, having upturned flanges H surrounding the same, and above the aperture is arranged a cap member I, having faces oppositely inclined from a central ridge to direct the material lodging thereon to the imperforate portion of the apron. Beneath the apron G is a second apron J of similar construction but reversely inclined to discharge at the opposite end of the casing. Beneath the latter apron is the bottom K of the casing, which is provided with a series of apertures L therein, to which air may be admitted.

M is a fan or suction device located within the casing B above the screen, and preferably in a compartment N separated from the screen compartment by the horizontal partition O. In this partition O are a series of valve controlled openings, the valves P of which may be adjusted to various positions by suitable external operative adjusting devices such as the members P'. The fan M, though located within the casing B, is mounted upon bearings secured to the rigid frame A. These bearings include brackets Q upon the side bars of the frame A and forming journals for the fan arbor, while the fan casing is supported by a top plate R secured to the side and extending above the casing B. The fan casing depends from this plate R and extends through an aperture S in the top of the casing B, while the shaft or arbor of the fan passes through apertures T in the sides of the casing. Escape of air through these apertures is prevented by flexible tubular connections U, preferably formed of cloth, which permit of independent oscillation of the housing B, while maintaining air tight connection between said housing and the fan.

The stock is fed into the machine directly above the screen F at the upper end thereof, and by means of flexible tube V. The tailings from the lower end of the screen are discharged through a spout W, which is vented by the grating W' in the side thereof. The discharge from the apron G is through a spout U' adjacent to the spout W, and is discharged from the apron J through a spout J' at the opposite end of the casing. The apron G is also provided with a series of cut-off slides X which, when open, will permit the discharge of the material from the upper portion of said apron on to the lower apron J.

With the construction as described, in operation, rotary motion being imparted to the crank D and also to the fan arbor, the housing B will be given a longitudinal and lateral oscillatory movement and at the same time suction will be produced in the chamber N, which is communicated through the valve controlled openings in the partition O to the chamber above the screen. The stock to be purified is fed through the flexible tube V and to the upper end of the screen F, and is distributed thereover and gradually fed downward by the oscillatory movement of the casing. During this movement the upward draft of air passing through the screen will carry off the impurities, and at the same time the stock is graded, a portion of it passing through the screen F onto its apron G and another portion tailing over the end of the screen F and discharging through the spout W. The screen is formed of a series of cloths of different mesh becoming progressively coarser toward the lower end, and thus the material first passing through the screen is the finest, while that from the opposite end is coarser. Separation between these two grades may be effected by drawing one of the slides X, and by selecting different members of the series of the slides the desired grading effect is obtained. The material dropped upon the apron and upon the cap I is fed downward by the oscillation of the casing, while the incoming draft of air passes between the flanges H and the cap, the cap preventing the passage of the material through the aperture. The cut-off X permits the discharge of the material from the upper apron to the lower one where it is conveyed to the discharge spout J', while the material falling upon the apron G, below the cut-off, will be discharged through the spout U'. The tailings from the screen F drop through the spout W, while the incoming air through the grating W' passing through this discharge will effect further purification. To clean the screen, I preferably employ any of the means well known in the art, but, as this feature forms no part of my invention, I have omitted it from the drawings for the sake of clearness.

What I claim as my invention is:

1. A purifier comprising an oscillatory casing, an inclined screen within said casing, an inclined apron beneath said screen, a discharge spout for said screen, means within said casing for causing an upward draft of air through said screen, and stationary supports without said casing to which said means is secured.

2. A purifier comprising an oscillatory casing, an inclined screen therein, an inclined apron beneath said screen, a discharge spout for said apron, said apron being apertured, a deflector cap above said apron, means within said casing for causing an upward draft of air through the aperture in said apron and through the screen, and stationary supports without said casing to which said means is secured.

3. A purifier comprising an oscillatory casing, having an aperture therein, an inclined screen within the casing, a suction fan also located within the casing and extending outwardly through the aperture, said aperture being of sufficient size to permit of relative oscillation between the fan and casing, stationary supports without the casing to which the fan is secured, and means for maintaining said casing air tight.

4. A purifier comprising an oscillatory casing having an aperture therein, a screen within the casing, a suction fan also within the casing above said screen and extending outward through the aperture, said aperture being of sufficient size to permit of relative oscillation between the fan and casing, stationary supports for said fan arranged without the casing, and a flexible connection for sealing the joint between said casing and said fan.

5. A purifier comprising an oscillatory casing, a horizontal partition in said casing having apertures therein, adjustable valves controlling said apertures, an inclined screen beneath said partition, an apertured bottom for said casing and a suction fan within said casing above said partition for causing an upward draft of air through said apertured bottom and screen, and stationary supports for said fan without said casing.

6. A purifier comprising an oscillatory casing, a screen within said casing, an inclined apron beneath said screen, being centrally and longitudinally apertured, upturned flanges on said apron bounding the aperture therein, a cap above said flanges and spaced therefrom having the central ridge and portions oppositely inclined therefrom, substantially as and for the purpose described.

7. A purifier comprising a casing, an inclined screen therein, an inclined apron beneath said screen centrally and longitudinally apertured, a cap guarding said aperture, and a suction fan within said casing above said partition for causing an upward draft of air through said apertured bottom and screen, and stationary supports for said fan without said casing.

8. A purifier comprising an oscillatory casing, an inclined screen within said casing, an inclined apron beneath said screen, a discharge spout for said screen, a suction fan directly above said screen and apron for causing an upward draft of air through said screen, and stationary supports without said casing to which said fan is secured.

9. A purifier comprising an oscillatory casing having an aperture therein, and a suction fan located within the casing and extending outward through the aperture, said aperture being of sufficient size to permit of relative oscillation between the parts, and stationary supports for said fan, whereby the casing oscillates independent of the fan.

10. A purifier comprising an oscillatory casing, an inclined screen therein, discharge spouts at the opposite ends of the casing, an inclined apron beneath said screen leading to one of the discharge spouts, an oppositely inclined apron leading to the other discharge spout, means for discharging material from said apron at various points in the length upon the lower apron, a suction fan within said casing, and stationary supports for said fan without the casing.

In testimony whereof I affix my signature in presence of two witnesses.

LUTHER A. TATOR.

Witnesses:
NELLIE KINSELLA,
JAMES P. BARRY.